(12) United States Patent
Kientz et al.

(10) Patent No.: US 12,351,986 B2
(45) Date of Patent: Jul. 8, 2025

(54) TISSUE PRODUCT AND METHOD AND APPARATUS FOR PRODUCING SAME

(71) Applicant: Essity Hygiene and Health Aktiebolag, Gothenburg (SE)

(72) Inventors: Emmanuelle Kientz, Kunheim (FR); Agne Buob, Kunheim (FR); Hans-Jürgen Lamb, Mannheim (DE); Carlo Russo, Mainz-Kostheim (DE); Jürgen Sauter, Ismanning (DE); Sébastien Jeannot, Kunheim (FR)

(73) Assignee: Essity Hygiene and Health Aktiebolag, Gothenburg (SE)

( * ) Notice: Subject to any disclaimer, the term of this patent is extended or adjusted under 35 U.S.C. 154(b) by 140 days.

(21) Appl. No.: 17/783,395

(22) PCT Filed: Dec. 18, 2019

(86) PCT No.: PCT/SE2019/051307
§ 371 (c)(1),
(2) Date: Jun. 8, 2022

(87) PCT Pub. No.: WO2021/126026
PCT Pub. Date: Jun. 24, 2021

(65) Prior Publication Data
US 2023/0011745 A1    Jan. 12, 2023

(51) Int. Cl.
*D21H 27/00* (2006.01)
*B31F 1/07* (2006.01)
(Continued)

(52) U.S. Cl.
CPC ............ *D21H 27/005* (2013.01); *B31F 1/07* (2013.01); *B31F 1/122* (2013.01); *D21H 27/40* (2013.01);
(Continued)

(58) Field of Classification Search
CPC .... D21H 27/005; D21H 27/40; D21H 27/004; B31F 1/122; B32B 3/28; B32B 3/30
See application file for complete search history.

(56) References Cited

U.S. PATENT DOCUMENTS 3,163,575 A    12/1964 Nobbe
3,507,745 A    4/1970 Fuerst
(Continued)

FOREIGN PATENT DOCUMENTS

EP    1081284 A1    3/2001
EP    1099539 A1    5/2001
(Continued)

OTHER PUBLICATIONS

International Search Report (PCT/ISA/210) and Written Opinion (PCT/ISA/237) mailed on Aug. 20, 2020, by the Swedish Patent Office as the International Searching Authority for International Application No. PCT/SE2019/051307. (10 pages).
(Continued)

*Primary Examiner* — Jasper Saberi
(74) *Attorney, Agent, or Firm* — Buchanan Ingersoll & Rooney PC

(57) ABSTRACT

A multi-ply tissue paper product includes at least three plies. The tissue paper product includes a first inner ply being a creped ribbed ply and having a basis weight of 10 to 30 gsm, and a first outermost ply and a second outermost ply on each side of said inner ply, the first and second outermost plies being non-ribbed plies, wherein a creped ribbed ply is a ply including ribs and valleys providing an average core roughness Rk in the range 10 to 300 μm, and peaks being 4 to 12 per cm as measured along said first direction; and wherein a non-ribbed ply is a ply displaying no parallel ribs and valleys extending continuously along any direction of the ply or displaying parallel ribs and valleys extending con-
(Continued)

tinuously along any direction of the ply, the ribs and valleys providing peaks being less than 4 per cm.

25 Claims, 6 Drawing Sheets

(51) Int. Cl.
 *B31F 1/12* (2006.01)
 *D21H 27/40* (2006.01)
(52) U.S. Cl.
 CPC .............. *B31F 2201/0756* (2013.01); *B31F 2201/0764* (2013.01); *B31F 2201/0769* (2013.01); *B31F 2201/0787* (2013.01)

(56) References Cited

U.S. PATENT DOCUMENTS

| | | | |
|---|---|---|---|
| 3,738,905 A | | 6/1973 | Thomas |
| 5,685,954 A | * | 11/1997 | Marinack ............. D21H 25/005 162/111 |
| 5,690,788 A | | 11/1997 | Marinack et al. |
| 5,885,415 A | | 3/1999 | Marinack et al. |
| 5,919,556 A | | 7/1999 | Barnholtz |
| 6,096,168 A | | 8/2000 | Marinack et al. |
| 6,348,131 B1 | | 2/2002 | Kershaw et al. |
| 6,379,496 B2 | | 4/2002 | Edwards et al. |
| 6,425,983 B1 | | 7/2002 | Marinack et al. |
| 6,451,166 B1 | | 9/2002 | Marinack et al. |
| 6,649,025 B2 | | 11/2003 | Mills et al. |
| 7,622,020 B2 | | 11/2009 | Awofeso et al. |
| 7,794,566 B2 | | 9/2010 | Edwards et al. |
| 8,398,819 B2 | | 3/2013 | Yeh et al. |
| 2005/0022955 A1 | * | 2/2005 | Ward ...................... B32B 29/00 162/123 |
| 2010/0314059 A1 | | 12/2010 | Edwards et al. |
| 2017/0022660 A1 | * | 1/2017 | Suer ...................... D21H 27/02 |
| 2019/0021553 A1 | * | 1/2019 | Saas ..................... D21H 27/002 |
| 2019/0063004 A1 | * | 2/2019 | Barnholtz ................ B31F 1/07 |

FOREIGN PATENT DOCUMENTS

| | | | | |
|---|---|---|---|---|
| EP | 1116824 A2 | | 7/2001 | |
| EP | 1356923 A1 | | 10/2003 | |
| GB | 456032 A | | 11/1936 | |
| GB | 1364916 A | | 8/1974 | |
| JP | H11302999 A | | 11/1999 | |
| JP | 2018154957 A | | 10/2018 | |
| WO | 2009151544 A2 | | 12/2009 | |
| WO | WO-2017129240 A1 | * | 8/2017 | ............. A47K 10/16 |
| WO | WO-2018166572 A1 | * | 9/2018 | ................ B31F 1/07 |
| WO | 2019221647 A1 | | 11/2019 | |
| WO | WO-2020091748 A1 | * | 5/2020 | ................ B31F 1/07 |

OTHER PUBLICATIONS

Examination Report issued on Aug. 10, 2023, by the Chilean Patent Office in corresponding Chilean Patent Application No. 202201666 and English summary of the Report. (15 pages).
M. Hubbe et al., "What Happens to Cellulosic Fibers During Papermaking and Recycling? A Review", BioResources, Nov. 17, 2007, vol. 2, No. 4, pp. 739-788.
R.C. Howard et al., "The Basic Effects of Recycling on Pulp Properties", Journal of Pulp and Paper Science, Jul. 1992, vol. 18, No. 4, pp. J151-J159.
T. Laukala et al., "Influence of Pulp Type on the Three-Dimensional Thermomechanical Convertibility of Paperboard", Cellulose, Jan. 25, 2019, vol. 26, pp. 3455-3471.
Y. Seo et al., "Mechanical Impact Treatment on Pulp Fibers and Their Handsheet Properties", Journal of Korea TAPPI, 2002, vol. 34, No. 5, pp. 56-62.
Supplemental European Search Report issued in European Patent Application No. EP 19956697, dated Nov. 2, 2023 (7 pages).
Substantive Examination from Intellectual Property Corporation of Malaysia for Application No. PI2022003237 dated Nov. 7, 2024.

* cited by examiner

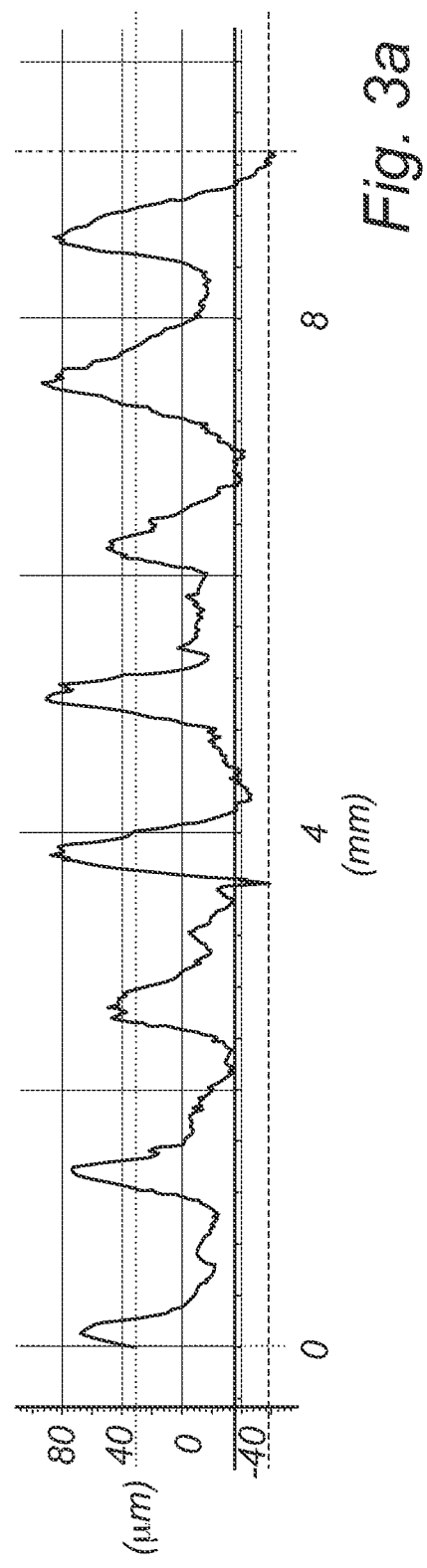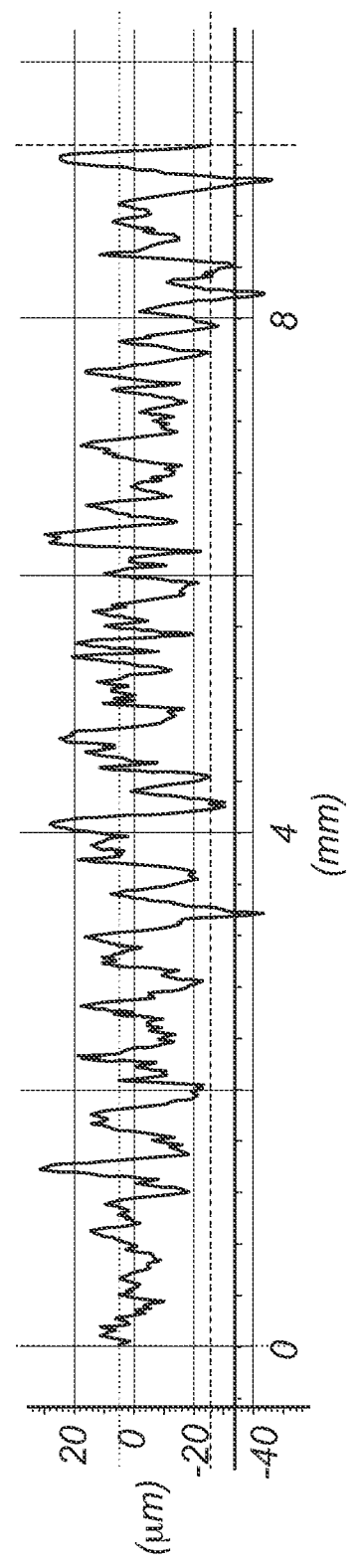

TISSUE PRODUCT AND METHOD AND APPARATUS FOR PRODUCING SAME

FIELD OF TECHNOLOGY

The invention relates to a multi-ply tissue paper product, particularly a hygiene or wiping product, with at least a first outer ply, a second outer ply, and at least one inner ply, and a method of producing such a tissue product.

BACKGROUND

In the following, a "tissue paper product" relates to an absorbent paper based on cellulose wadding which is also called tissue paper base-sheet in this field of technology.

Tissue paper is defined as a soft absorbent paper having a low basis weight, of for example 8 to 40 $g/m^2$, preferably 10 to 25 $g/m^2$ per ply. The total basis weight of multi-ply tissue products may preferably be up to a maximum of 110 $g/m^2$, more preferably to a maximum of 80 $g/m^2$. Its density is typically below 0.6 $g/cm^3$, preferably below 0.30 $g/cm^3$ and more preferably between 0.08 and 0.20 $g/cm^3$. The production of tissue paper is distinguished from conventional paper production, e.g. printing paper production, by its relatively low basis weight and relatively high tensile energy absorption index (see ISO 12625-4). Conventional paper and tissue paper also differ in general with regard to the modulus of elasticity that characterises the stress/strain properties of these generally planar products as a material parameter.

The fibres contained in the tissue paper are mainly cellulosic fibres, such as pulp fibres from chemical pulp (e.g. Kraft or sulphite), mechanical pulp (e.g. ground wood), thermo mechanical pulp, chemo-mechanical pulp and/or chemo-thermo-mechanical pulp (CTMP). Pulps derived from both deciduous (hardwood) and coniferous (softwood) can be used. Fibres may also come from non-wood plants e.g. cereal, bamboo, jute, and sisal. The fibres or a portion of the fibres may be recycled fibres, which may belong to any or all of the above categories. The fibres can be treated with additives, e.g. fillers, softeners, such as, but not limited to, quaternary ammonium compounds and binders, conventional dry-strength agents, temporary wet strength agents or wet-strength agents, in order to facilitate the original paper making or to adjust the properties thereof. The tissue paper may also contain other types of fibres, e.g. regenerated cellulosic fibres or synthetic fibres for enhancing, for instance, strength, absorption, smoothness or softness of the tissue paper.

Tissue paper products in particular for use as hygiene or wiping products primarily include all kinds of dry-creped tissue paper, wet-creped paper, TAD-paper (Through Air Drying), tissue paper based on structured technologies such as ATMOS®, NTT, UCTAD and cellulose or pulp-wadding, or combinations, laminates or mixtures thereof. Typical properties of these hygiene and wiping products include the ability to absorb tensile stress energy, their drapability, good textile-like flexibility, properties which are frequently referred to as bulk softness, a high surface softness and a high specific volume with a perceptible thickness. A liquid absorbency as high as possible and, depending on the application, a suitable wet and dry strength as well as an appealable visual appearance of the outer product's surfaces are desired. These properties, among others, allow these hygiene and wiping products to be used, for example, as cleaning wipes such as windscreen cleaning wipes, industrial wipes, kitchen paper or the like; as sanitary products such as for example bathroom tissue, handkerchiefs, household towels, towels and the like; as cosmetic wipes such as for example facials and as serviettes or napkins, just to mention some of the products that can be used. Furthermore, the hygiene and wiping products can be dry, moist, wet, printed or pre-treated in any manner. In addition, the hygiene and wiping products may be folded, interleaved or individually placed, stacked or rolled, connected or not, in any suitable manner.

The products described above can be used for personal and household use as well as commercial and industrial use. They are adapted to absorb fluids, remove dust, and for other cleaning purposes. If tissue paper is to be made out of pulp, the process essentially comprises a forming step that includes a headbox- and a forming wire section, and a drying section, either through air drying or conventional drying on a Yankee cylinder. The production process also usually includes the crepe process essential for tissue paper and, finally, typically a monitoring and winding area.

Tissue paper can be formed by placing the fibres, in an oriented or random manner, on one or between two endless continuously rotating wires or felts of a paper making machine while simultaneously removing water.

Further dewatering and drying the formed primary fibrous web occur in one or more steps by mechanical and thermal means until a final dry-solid content of usually about 90 to 99% has been reached.

In case of creped tissue paper making, this stage is followed by the crepe process which crucially influences the properties of the finished tissue product in conventional processes. The conventional dry crepe process involves creping on a usually 3.0 to 6.5 m diameter drying cylinder, the so-called Yankee cylinder, by means of a crepe doctor blade with the aforementioned final dry-solids content of the raw tissue paper. Wet creping can be used as well, if lower demands are made of the tissue quality. The creped, finally dry raw tissue paper, the so-called base tissue, is then available for further processing into the paper product for a tissue paper product.

Instead of the conventional tissue making process described above, the use of a modified technique is possible in which an improvement in specific volume is achieved by a special kind of drying which leads to an improvement in the e.g. caliper, bulk, softness, etc. of the tissue paper. This process, which exists in a variety of subtypes, is termed the TAD (Through Air Drying) technique.

The processing step from the base tissue to the finished tissue product occurs in processing machines (converting machines) which include operations such as unwinding the base tissue, calendering of the tissue, laminating, printing or embossing.

Several plies may be combined together by a combining operation of a chemical nature (e.g. by adhesive bonding), or of a mechanical nature (e.g. by knurling or so-called edge-embossing), or a combination of both. Examples of such process steps for combining plies together will be described in more detail in the below.

Further, the processing to finished tissue product may involve e.g. longitudinal cut, folding, cross cut etc. Moreover, individual tissue products may be positioned and brought together to form stacks, which may be individually packaged. Such processing steps may also include application of substances like scents, lotions, softeners or other chemical additives.

When several plies are combined together using adhesive bonding, a film of adhesive is deposited over some or all of the surface of at least one of the plies, then the adhesive-treated surface is placed in contact with the surface of at least one other ply.

When several plies are combined together using mechanical bonding, the plies may be combined by knurling, by compression, by edge-embossing, union embossing and/or ultrasonic.

Mechanical and adhesive bonding may also be combined to combine several plies together to form a multi-ply product.

Embossing is to change the shape of a sheet from flat to shaped, so that there are areas that are raised and/or recessed from the rest of the surface. It therefore constitutes a deformation of the previously flat sheet, and results in a ply having a particular relief. The thickness of the ply or of the multiple plies is increased after embossing compared with its initial thickness.

An embossing process is carried out between an embossing roll and an anvil roll. The embossing roll can have protrusions or depressions on its circumferential surface leading to embossed protrusions/depressions in the paper web. Anvil rolls may be softer than the corresponding embossing roll and may consist of rubber, such as natural rubber, or plastic materials, paper or steel. If the anvil roll is made of a softer material like rubber, a contact area/nip can be formed between the embossing roll (e.g. steel roll) and the anvil roll by the deformation of the softer roll.

By embossing, a pattern can be applied to a tissue paper fulfilling a decorative and/or functional purpose.

A functional purpose may be to improve the properties of the hygiene paper product, that is, the embossment may improve the product thickness, absorbency, bulk, softness etc.

A functional purpose may also be to provide a joint to another ply in a multi-ply product.

In the context of this application, an embossment performed in order to form a bond or joint to another ply is referred to as "construction embossment". A construction embossment may be made to perform joining of plies using adhesive and/or mechanical ply-bonding.

Another type of embossment is referred to herein as a "pre-embossment". A pre-embossment could preferably be applied to a web or ply prior to its joining to the other plies of a multi-ply tissue product.

Such pre-embossment may be made for a functional purpose e.g. as laid out in the above to increase the thickness of the ply, the absorbency, bulk and/or softness.

Both "pre-embossments" and "construction embossments" may in addition to their functional purpose also serve a decorative purpose, i.e. the embossment patterns may be designed to be decorative.

"Micro-embossment" is used herein for an embossment pattern with a dense configuration. Typically, the micro-embossment may comprise dots in the range 25 to 100 dots per $cm^2$, preferably 35 to 80 dots per $cm^2$. A micro-embossment may advantageously be a pre-embossment.

The micro-embossed dots may have different relatively simple surface shapes such as circles, ovals, squares, rectangles or diamonds.

A micro-embossed ply may be micro-embossed all over the surface of the ply. Optionally, a micro-embossed ply may be micro-embossed over more than 60% of the surface of the ply, preferably more than 70%.

"Construction embossments" often consist of more complex shapes than the micro-embossments, e.g. forming decorative elements such as flowers, logos, animals or the like. Typically, these elements are larger in size compared to the dots of a micro-embossment, and cover less than 10%, preferably between 3 and 6% of the tissue surface.

Any embossing can lead to embossed elements all having the same height or to embossing elements having different heights.

With a "non-embossed" ply as used herein is meant a ply which is not pre-embossed.

However, a non-embossed ply could be provided with construction embossments, unless this is specifically excluded.

For manufacturing multi-ply tissue products, especially hygiene or wiping products such as bathroom tissue and household tissue, a number of manufacturing methods for embossing and adhesively bonding of the plies have been developed. For example, there is Goffra Incolla/spot embossing, DESL (Double Embossing Single Lamination)/Nested, the "NesFip" technology as described in EP 1 081 284A1, the "NoveFip" technology as described in PCT/IB2018/001556 and Pin-to-Pin/Foot-to-Foot embossing.

In the first mentioned manufacturing method, Goffra Incolla, a first web is directed through the nip between an embossing roll and an anvil roll. In this nip the web is provided with a construction embossing pattern. Thereafter, an application roll for adhesive applies adhesive to those parts of the first web at which there are protruding embossing elements in the embossing roll. The adhesive is transported from an adhesive bath via an adhesive transfer roll to the application roll. A second web is transported to the first web and adhesively bonded to the first web in the nip between the so-called marrying roll and the embossing roll. The adhesive bonding takes place at those portions of the embossing pattern at which the adhesive was applied.

The second manufacturing method (DESL/Nested) is very similar to the above-described Goffra Incolla method. It comprises an additional pair of rolls consisting of a second embossing roll and a second anvil roll. The additional pair of rolls serves to emboss the second web before it is adhesively bonded to the first web using the marrying roll. Typically, the additional pair of rolls is placed close to the first pair of rolls and the marrying roll. Especially when using the so-called Nested-method such close arrangement is important. The Nested-method can be considered as a special case of the general DESL-manufacturing method. For the Nested-method the embossing elements of the first embossing roll and the embossing elements of the second embossing roll are arranged such that the embossed elements of the first embossed ply and the embossed elements of the second embossed ply fit into each other similar to a gearing system. This serves to achieve a mutual stabilization of the two plies.

However, for the DESL manufacturing method such correlation between the embossed elements of the first, upper ply and the second, lower ply, does not have to apply. Nevertheless, in the literature the term DESL is often used synonymous to a Nested-method.

The third manufacturing method (Pin-to-Pin/Foot-to-Foot) is similar to the DESL method. By means of two pairs of rolls both the upper ply and the lower ply are embossed, respectively. Adhesive is applied onto the embossed protrusions of the first ply. The ply bonding however, is not achieved by means of a marrying roll as in the DESL method but is achieved directly by means of the protruding embossing elements of the second embossing roll. In order to achieve this, an exact adjustment of the width of the nip between the first embossing roll and the second embossing roll is required, which is mainly defined by the individual thickness of both webs (upper ply and lower ply). Further, the embossing rolls have to be designed such that the protruding embossing elements of both rolls face each other. This is the reason why the terminology Pin-to-Pin or Foot-to-Foot embossing is used.

All above described methods have the following common features: the first embossing roll is formed of a hard material, usually metal, especially steel, but there are also known embossing rolls made of hard rubber or hard plastics materials. The embossing rolls can be a male roll having individual protrusions. Alternatively, the embossing roll can be a female roll with individual embossing depressions.

Typical heights/depths of the engraved embossing patterns are between 0.4 and 2.0 mm. The anvil roll typically has a rubber coating with a hardness between 35 Shore A and 85 Shore A. However, structurized anvil rolls, especially rolls made of paper, rubber or plastics materials or steel are also known. The applicator roll for adhesive is usually also a rubber roll with a plain smooth circumferential surface, wherein the hardness of the rubber coating is between the hardness of the anvil roll and the hardness of the marrying roll. Commonly used values for the hardness of the rubber coating are 70 to 85 Shore A. When selecting the rubber material its compatibility with the adhesive to be applied has to be ensured.

The application system for adhesive consisting of applicator roll, adhesive transfer roll and adhesive bath can be designed as a so-called immersion roll system in which the adhesive transfer roll is immersed into the adhesive bath and transports adhesive by means of surface tension and adhesive forces out of the adhesive bath. By adjusting the gap between the adhesive transfer roll and the applicator or application roll, the amount of adhesive to be applied can be adjusted. Application rolls may be structured rolls.

Typical adhesives are polyvinyl alcohol and methyl cellulose based adhesives.

Adhesive transfer rolls have become known having defined pit-shaped depressions in their circumferential surface. Such adhesive transfer rolls are known as anilox rolls. Such roll is usually made of ceramic material or it is a roll made of steel or copper and coated with chromium. Excessive adhesive is removed from the surface of the anilox roll by means of a blade. The amount of adhesive is determined by the volume and the number of depressions.

Alternative application systems for applying adhesives are based on spraying equipment (e.g. Weko-technique).

A second possibility to influence the amount of adhesive transferred is the adjustment of the difference in circumferential speeds of the adhesive transfer roll and the applicator roll. Typically, the adhesive transfer roll rotates slower than the applicator roll. The circumferential speed of the adhesive transfer roll is usually between 5% and 100% of the first circumferential speed of the applicator roll. The adhesive bath can be designed as a simple trough, application systems with a blade can also be designed as chamber systems.

The embossing technologies Goffra Incolla/spot embossing and DESL/Nested, both use an additional roll, the so-called marrying roll for laminating together the plies. The marrying roll commonly has a smooth rubber surface. A suitable material is e.g. NBR (acrylnitrile-butadien rubber). However, marrying rolls also have become known which, in addition to the rubber coating, are provided with a steel coating. Such steel coating is often provided in form of a steel band spirally wound onto the rubber coating.

In case that the single layers individually or together are micro-embossed, a so-called micro-pre-embossing device can be used. Such pre-embossing device is often used in combination with the Goffra Incolla technology.

Also commonly used is a printing onto the tissue product before or after the ply bonding step. Also known are variants including the application of chemical substances, especially lotions and softeners.

Another well-known embossing technique comprises a steel embossing roll and a corresponding anvil steel roll (so called Union embossing). The surfaces of these rolls are being formed in such a manner that deformation of the paper and mechanical ply bonding without using adhesives are achieved within one single embossing step.

When using all of the above described embossing methods it is advantageous to provide a control for the tension of the web both before and after the ply bonding because the physical properties of the web and especially the stress strain characteristic can be changed significantly in the embossing step.

The embossing technology also comprises so-called "double height embossing" whereby the embossing protrusions have different heights. The embossing not only serves to provide bulk to the fibrous product but also to provide an improved optical appearance to the product. The optical appearance can be improved by combining embossing and coloring steps. Another reason for embossing is to generate higher absorbency or improved perceived softness.

For double-height embossing the higher elements usually "act" as construction embossments to provide ply-bonding, whereas the lower elements are often micro-embossment providing thickness to the ply without providing a bonding to another ply(ies). Double height embossing is typically used for the Nesfip or NoveFip embossing technology as described in the patent applications referred to in the above.

Although the multi-ply tissues and methods for production thereof proposed in the past may be very useful in many applications, there is still a need for improvements. Such improvements may relate to the thickness, softness, bulkiness, and absorption capacity of multi-ply tissue products. Such improvements may relate to user perceived properties such as feel and perceived softness. Further, this should preferably be obtained by using less paper fibres resulting in economic and environmental positive aspects.

SUMMARY

An object of the product and method as proposed herein is to provide an improvement in relation to one or more of the above-mentioned points.

This object is achieved by a tissue product according to claim 1.

A first aspect of the present disclosure relates to a multi-ply tissue paper product, particularly a hygiene or wiping product, comprising a first inner ply being a creped ribbed ply, a first outermost ply, and a second outermost ply on each side of the inner ply. The first and second outermost plies are non-ribbed plies. A multi-ply product will hence comprise two outermost plies.

With "outermost ply" is meant a ply which forms an outermost surface of a product or web.

With "inner ply" is meant a ply on the interior of the product or web, i.e. any ply other than the outer most plies. A product or web may contain one or more inner plies.

A creped ribbed ply is defined as a ply comprising creping lines extending along a first direction, and parallel ribs and valleys extending continuously along a second direction being substantially perpendicular to the first direction. The ribs and valleys give rise to an average core roughness $R_k$ as measured along said first direction in the range 10 to 300

µm, and to a number of peaks being 4 to 12 ribs per cm as measured along said first direction.

A non-ribbed ply is defined as a ply displaying no parallel ribs and valleys extending continuously along any direction of the ply or displaying parallel ribs and valleys extending continuously along any direction of the ply, said ribs and valleys providing a number of peaks being less than 4 per cm.

The definitions of a creped ribbed ply and a non-ribbed ply will be described in more detail in the detailed section of the application.

When evaluating a ply, e.g. determining whether it is a creped ribbed ply or a non-ribbed ply, it is to be understood that what is to be considered is the properties of the ply per se, i.e. of the web material from which the ply is formed.

Accordingly, the surface structures to be considered are the structures inherent in and extending all over the surface of the ply or sheet. In particular, construction embossment, i.e. embossments serving the purpose of assembling more than one ply together in a multi-ply product, are to be disregarded when evaluating a ply for being a creped ribbed ply or a non-ribbed ply.

The first direction is the cross-direction of the ply, whereas said second direction is the machine direction of the ply. The third direction being perpendicular to the first and second direction is a direction perpendicular to the generally two-dimensional extension of the ply.

Generally, for a creped ribbed ply to be defined as such, the ribs-and-valleys on at least one side of the ply should fulfil the requirements as set out in the definition in the above.

Preferably, the ribs-and-valleys on both sides of the ply should fulfil the requirements as set out in the definition in the above.

Preferably, the ribs on one side of the ply correspond to valleys on the other side of the ply, and the valleys on one side of the ply correspond to ribs on the other side of the ply.

Preferably, said ribs and valleys are non-embossed, i.e. said ribs and valleys are not formed by embossment. Instead, the ribs and valleys are formed during production of the ply. In particular, the ribs and valleys are achieved during the creping of the creped ribbed ply.

Preferably, the creped ribbed ply is produced using a creping blade provided with a rake edge comprising indentations.

The creping blade comprising said indentations will deform the web upon removal from the Yankee drier hence creating the creped ribbed structure.

Hence, the creped ribbed ply created using a creping blade with a rake edge comprising indentations will be regular in that the ribs and valleys display generally constant height, width, direction and distribution over the web or ply.

This is in contrast to e.g. the crepe lines which are also created upon removal of the web form the Yankee drier. The crepe lines will typically extend over the cross-direction of a web. Crepe bars will generally appear with a slight irregularity, and although it is possible to measure/calculate i.e. the number of crepe lines per cm on average, the crepe lines will not extend in a regular manner continuously over the web or ply.

This is also in contrast to e.g. embossed structures which are created by deformation of the web, usually within the later converting process. The ribs and valleys of the creped ribbed structure are non-embossed.

Moreover, the creped ribbed ply will generally display ribs and valleys on both faces of the ply. However, the height and shape of the ribs and valleys may vary slightly between the two sides. The number of ribs per cm will however be the same.

U.S. Pat. Nos. 5,690,788, 5,685,954, 5,885,415 and 6,096,168 all describe different techniques relating to the production of creped ribbed plies using a creping blade having a rake edge comprising indentations as mentioned in the above.

Tissue paper webs having a creped ribbed structure and as produced using a creping blade with a rake edge comprising indentations are known and proposed for use in single-ply and multi-ply tissues and towels. However, hitherto, the use of tissue paper webs having a creped ribbed structure has been limited primarily due to their limited softness.

Herein, it is proposed to use webs or plies having a creped ribbed structure as an inner ply in multi-ply products in variants which will be shown to display surprisingly good softness, increased thickness versus fibre consumption, in combination with sufficient strength and absorption properties. In particular, surprisingly good results have been achieved for multi-ply products having at least one inner ply with a creped ribbed structure as defined in the above, without the creped ribbed structure significantly adversely affecting the overall softness of the multi ply product. Accordingly, the presence of the ribs of the inner ply is not as detrimental to softness as previously been assumed. Instead, surprisingly good softness levels have been achieved, also when only one outermost ply is arranged outside of the inner ply comprising the creped ribbed structure.

Accordingly, the benefits of plies having a creped ribbed structure such as the relatively low fibre consumption with maintained thickness are rendered available to new types of products, in particular to relatively thin and soft multi-ply products.

For the combination of webs or plies into multi-ply webs or multi-ply tissue products, different manufacturing methods for embossing and/or adhesive bonding of the plies may be used with various advantages.

It has been found that the use of an inner ply being a creped ribbed ply may provide advantages in combination with different manners of joining the layers in the multi-ply product. For example, the use of a creped ribbed ply may be possible where other structures for providing increased thickness, e.g. embossment, are unsuitable considering the risk for unintentional nesting between embossments of adjacent plies.

As such, the tissue paper products as proposed herein comprises a first inner ply having a basis weight of 10 to 30 gsm, the first inner ply being a creped ribbed ply as defined in the above.

As for the outermost plies being non-ribbed plies as defined herein, a non-ribbed ply may display no parallel ribs and valleys extending continuously along any direction of the ply.

Alternatively, the non-ribbed ply may display parallel ribs and valleys extending continuously along any direction of the ply, but providing a number of peaks being less than 4 per cm, i.e. only scarcely distributed ribs and valleys. As such, the non-ribbed plies will generally not be perceived as "ribbed" by a user feeling over the surface of the non-ribbed plies. Rather, the non-ribbed plies will be perceived as soft, in particular in relation to a creped ribbed ply.

In this context, it may be worth mentioning that measurements of the number of peaks over a regular creped surface may give rise to a relatively large number of peaks per cm. However, creping lines do not give rise to parallel ribs and valleys extending continuously over the ply. Rather, creping lines are irregular lines whose height, width and distribution may vary as seen over a ply.

In contrast, parallel ribs and valleys extending continuously will be ribs and valleys displaying essentially constant widths and heights, and extending linearly and in parallel over the ply.

The non-ribbed plies may also be some kind of structured ply. As long as the plies do not display parallel ribs and valleys extending continuously along any direction of the ply, the outermost plies will be perceived as generally soft.

Optionally, said first inner ply comprises a number of peaks as measured along said first direction being 6 to 12 ribs per cm, preferably 8 to 12 ribs per cm and/or said ribs and valleys of said first inner ply providing an average core roughness Rk in the range 20 to 150 µm.

Optionally, the first inner ply has a basis weight of 12 to 28 gsm, preferably 14 to 24 gsm.

Optionally, on at least one side of said tissue paper product, preferably on each side of said tissue paper product, the tissue paper product comprises no more than two non-ribbed plies external of said inner ply.

It is believed to be particularly surprising that only two plies external to the inner ply being a creped ribbed ply are sufficient for the creped ribbed ply not to adversely affect the softness of the multi-ply product.

Optionally, on at least one side of said tissue paper product, preferably on each side of said tissue paper product, the tissue paper product comprises no more than one non-ribbed ply external of said inner ply.

It is believed to be even more surprising that only one non-ribbed ply external to the inner ply being a creped ribbed ply may be sufficient for the creped ribbed ply not to adversely affect the softness of the multi-ply product.

Optionally, said ply or plies external of said inner ply and which are non-ribbed plies each have a basis weight being less than 30 gsm, between 10 and 30 gsm, most preferred between 12 and 25 gsm.

As outlined in the above, it is sufficient to provide a ply or plies with relatively low basis weight outside of the inner ply being a creped ribbed ply, and still achieve satisfactory softness of the product.

In particular, only two plies, both having the relatively low basis weight proposed above, and arranged outside of the inner ply with the creped ribbed structure may be sufficient. Particularly, only one ply having the proposed relatively low basis weight and being arranged outside of the inner ply may be sufficient.

Optionally, the outermost ply or plies being a non-ribbed ply (plies) displays no parallel ribs and valleys extending continuously along any direction of the ply or each display parallel ribs and valleys extending continuously along any direction of the ply, said ribs and valleys providing a number of peaks being less than 2 per cm, preferably less than 1 per cm.

Optionally, the outermost ply or plies being a non-ribbed ply (plies) displays no parallel ribs and valleys extending continuously along any direction of the ply or each display parallel ribs and valleys extending continuously along any direction of the ply, said ribs and valleys providing said ribs and valleys providing an average core roughness Rk less than 10 µm, preferably less than 5 µm.

Optionally, the multi-ply tissue paper product comprises an adhesive joining at least two of the plies of said multi-ply tissue product, said adhesive being applied over a total adhesive area being less than 10% of a total area of said multi-ply tissue product, preferably less than 6% of a total area of said multi-ply tissue product, most preferred 3 to 6% of a total area of said multi-ply tissue product.

With adhesive applied over a total adhesive area being less than 10% of a total area, this indicates a relatively large area which is not bonded by adhesive, which, in turn implies that the multi-ply product is relatively soft. In such a product, structures of inner layers tend to be felt through the outer layer. However, as has been found herein, inner plies with a creped ribbed structure may be used also in combination with a low total adhesive area and still provide satisfactory softness.

Optionally, the multi-ply tissue paper product comprises construction embossments joining at least two of the plies of said multi-ply tissue product, said construction embossments being applied over a total construction embossment area being less than 10% of a total area of said multi-ply tissue product, preferably less than 6% of a total area of said multi-ply tissue product, most preferred 3 to 6% of a total area of said multi-ply tissue product.

With construction embossments applied over a total construction embossment area being less than 10% of a total area, this indicates a relatively large area which is not bonded by construction embossments, which, in turn implies that the multi-ply product is relatively soft. In such a product, structures of inner layers tend to be felt through the outer layer. However, as has been found herein, inner plies being creped ribbed plies may be used also in combination with a low total construction embossment area and still provide satisfactory softness.

Optionally, the multi-ply tissue paper product comprises no more than five plies, preferably no more than four plies, most preferred no more than three plies.

Clearly, a lesser number of plies in a product renders the risk of the structure of an inner layer being felt through to the outside of the product greater.

Optionally, the multi-ply tissue paper product comprises four plies only.

Optionally, the multi-ply tissue paper product comprises three plies only.

Optionally, said first and/or second outermost ply is a creped ply.

Optionally, said first and/or second outermost ply is a TAD ply.

Optionally, the first and/or second outermost ply is/are a pre-embossed plie(s), preferably micro-embossed.

Optionally, the product comprises at least a second inner ply.

Optionally, the second inner ply is a pre-embossed ply, preferably a micro-embossed ply.

Optionally, the second inner ply is a creped ribbed ply.

Optionally, the second inner ply may comprise 6 to 12 ribs per cm, preferably 8 to 12 ribs per cm as seen along said first direction.

Optionally, the second inner ply has a basis weight of 12 to 28 gsm, preferably 14 to 24 gsm.

Optionally, the product comprises one to four inner plies all being creped plies comprising a creped ribbed structure, optionally as set out in the above.

Optionally, the second inner ply is a non-ribbed ply.

Optionally, when the product comprises a second inner ply, the first inner ply is non-embossed, and the second inner ply is micro-embossed.

Optionally, the first and second inner plies are adjacent plies in the product.

Optionally, the first inner ply is non-embossed.

Optionally, the first inner ply is construction embossed in register with at least one, preferably both of two adjacent plies to said first inner ply, so as to form nested joints between the first inner ply and the adjacent ply or plies.

Optionally, at least one, preferably both of two adjacent plies to the first inner ply is/are construction embossed to join to the first inner ply.

Optionally, said adjacent plies are joined to the first inner ply by adhesive and/or said adjacent plies are joined to the first inner ply by mechanical ply-bonding.

Optionally, at least one, preferably both of said two adjacent plies to the first inner ply are pre-embossed.

Optionally, at least one of the two adjacent embossed plies is the first or second outermost ply, preferably said two adjacent embossed plies are the first and the second outermost plies.

Optionally, a first adjacent ply to the inner ply comprises a first embossment pattern and a second embossment pattern, the height of the second embossment pattern being less than the height of the first embossment pattern, wherein the inner ply and the first adjacent ply are joined at a level of at least part of the tops of the first embossment pattern of said first outer ply, whereby said first embossment pattern is a construction embossment pattern and said second embossment pattern is not a construction embossment pattern.

Optionally, the inner ply and the first adjacent ply are joined in a nested mode.

Optionally, the first adjacent ply, the inner ply and the second adjacent ply to the inner ply are joined by adhesive joints at a level of the first embossment pattern.

Optionally, said first adjacent ply is said first outermost ply and/or said second adjacent ply is said second outermost ply.

Optionally, said first outermost ply comprises a first embossment pattern and a second embossment pattern, the height of the second embossment pattern being less than the height of the first embossment pattern, wherein said second outermost ply is micro-embossed, and wherein said first inner ply is non-embossed.

Optionally, the product comprises a second inner ply, said second inner ply being non-embossed or micro-embossed.

Optionally, the first embossment pattern of the first outermost ply is a construction embossment pattern and said second embossment pattern of the first outermost ply is not a construction embossment pattern.

Optionally, the inner ply and the first outermost ply are joined at a level of at least part of the tops of the first embossment pattern of said first outermost ply.

The multi-ply tissue product according to the first or second aspect herein may both be combined with the optional features as mentioned in the above. All combinations of such features are considered to be a part of this disclosure.

For the combination of webs or plies into multi-ply webs or multi-ply tissue products, different manufacturing methods for embossing and/or adhesively bonding of the plies may be used with various advantages.

In a second aspect, there is provided a method for manufacturing a multi-ply tissue paper web for tissue paper products comprising Providing a first inner web having a basis weight of 10 to 30 gsm, and being a creped ribbed web, a creped ribbed web being defined as a web comprising creping lines extending along a first direction, and parallel ribs and valleys extending continuously along a second direction being substantially perpendicular to said first direction, said ribs and valleys providing an average core roughness Rk in the range 10 to 300 μm, and a number of peaks being 4 to 12 per cm as measured along said first direction;

Providing a first and a second web being non-ribbed webs, wherein a non-ribbed web is defined as a web displaying no parallel ribs and valleys extending continuously along any direction of the web or displaying parallel ribs and valleys extending continuously along any direction of the web, said ribs and valleys providing a number of peaks being less than 4 per cm;

Positioning said first inner web between said first and second non-ribbed webs;

Ply-bonding said webs to a form a multi-ply web wherein said first and second non-ribbed webs form the outermost plies of the multi-ply web.

Optionally, the step of providing a first inner web comprises providing a first creped ribbed web being produced using a creping blade provided with a rake edge comprising indentations.

Optionally, said rake edge comprises indentations in a number of 4 to 12 per cm over the rake edge length, and/or said indentations having a depth of 0.1 to 1.0 mm.

Optionally, the method comprises that the first web is embossed with a first embossment pattern and a second embossment pattern, the height of the second embossment pattern being less than the height of the first embossment pattern, wherein the inner web and the first web are joined at a level of at least part of the tops of the first embossment pattern of said first outer web, whereby said first embossment pattern is a construction embossment pattern and said second embossment pattern is not a construction embossment pattern.

Optionally, the first web, the inner ply and the second web are joined by adhesive joints at a level of the first embossment pattern.

Optionally, the method comprises providing the multi-ply web with perforations dividing the web into individual multi-ply products, or cutting the multi-ply web to form individual multi-ply products.

Optionally, the method comprises steps of producing a product according to any one of the options as stated in the above regarding the first aspect of the invention.

The products as described herein may be used for different purposes, such as handkerchiefs, facials, napkins, wipes, household towels, or bathroom tissue.

BRIEF DESCRIPTION OF THE DRAWINGS

With reference to the appended drawings, below follows a more detailed description of multi-ply products cited as examples.

In the drawings:

FIG. 3a illustrates roughness measurements made on a creped ribbed ply in the cross-direction CD;

FIG. 3b illustrates roughness measurements made on a standard creped ply made by CWP (Conventional Wet Pressing) in the machine direction MD;

DETAILED DESCRIPTION

Figure 1:
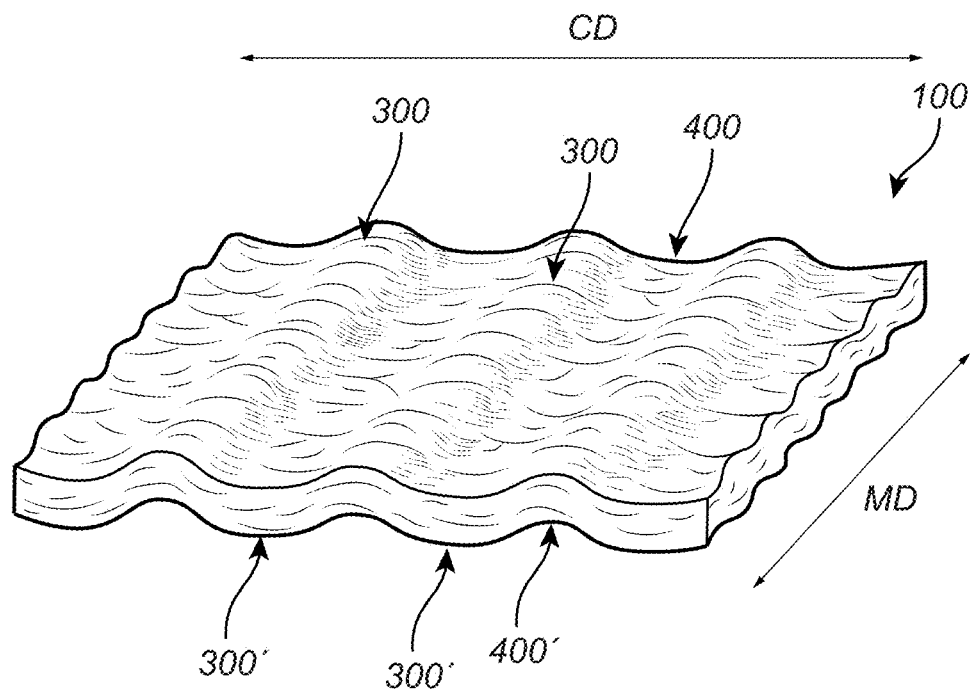
FIG. 1 schematically illustrates a ply being a creped ribbed ply.

FIG. 1 is a perspective view schematically illustrating a ply being a creped ribbed ply as described herein.

The creped ribbed ply displays creping lines as is typical for creped products. The creping lines extend generally along a first direction, which is the cross-direction of the ply. Creping lines, being the result of wrinkling when the creped product is removed from the dryer by the doctor blade, are usually slightly irregular in their nature.

The creped ribbed ply also displays ribs and valleys extending continuously and in parallel along a second direction perpendicular to the first direction of the ply. The second direction would hence be the machine direction of the ply. The structure of the creped ribbed ply is regular, meaning that the distribution and shape of the ribs have a regular appearance over the ply.

If seen from a top side of the creped ribbed ply (with reference to FIG. 1) a plurality of ribs 300 extend in parallel forming valleys 400 between them. The ribs 300 and valleys 400 extend regularly and continuously all over the ply. As seen in FIG. 1, the ribs and valleys are apparent also on a bottom side of the product, where the bottom side of the upwardly directed ribs 300 form bottom-side valleys 400' and the bottom side of the upwardly directed valleys 400 form bottom-side ribs 300'. Generally, the top side and the bottom side ribs 300, 300' may not be identical, but the height of the ribs may be greater on one of the sides.

As proposed herein, at least one inner ply of the multi-ply product claimed should be a creped ribbed ply as defined herein and as illustrated in FIG. 1.

Hence, creped ribbed ply is a ply comprising creping lines extending along a first direction, and parallel ribs and valleys extending continuously along a second direction being substantially perpendicular to said first direction, said ribs and valleys providing an average core roughness Rk in the range 10 to 300 µm, preferably 20 to 150 µm, and a number of peaks being 4 to 12 per cm as measured along said first direction.

Core Roughness Rk is defined according to ISO 13565-1 and ISO 13565-2.

Figure 2:
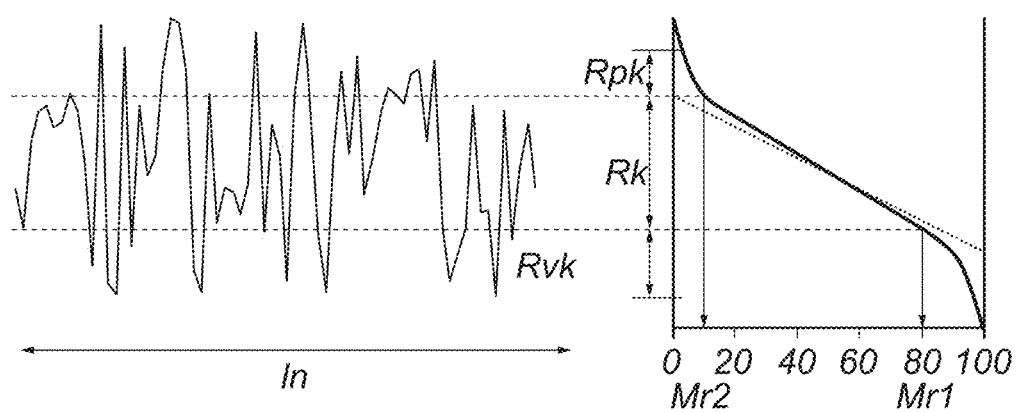
FIG. 2 illustrates an Abbott-Firestone curve as used for defining roughness parameters.

The roughness profile as per ISO 13565-1 is generated by a special filtering technique minimizing profile distortions due to deep valleys in plateau profiles. A straight line divides the Abbott-Firestone curve (See FIG. 2) into three areas from which the parameters are then computed as per ISO 13565-2.

Core roughness depth Rk is the depth of the roughness core profile. In other words, it is the core height of the profile along the Y-axis of the Abbott-Firestone curve generated by placing a 40% line on the curve at the minimum slope point and extending the lines to the 0% and the 100% points.

Reduced peak height Rpk is the mean height of the protruding peaks above the roughness core profile.

Reduced valley depth Rvk is the mean depth of the valleys protruding from the roughness core profile.

Mr1 and Mr2 are the smallest and the highest material ratios of the roughness core profile.

Evaluation length is the length over which the values of surface parameters are evaluated. It is recommended that the evaluation length consists of five sampling lengths although it may comprise any number of sampling lengths.

Mean Line is the reference line about which the profile deviations are measured. The mean line of the roughness profile is usually established by analogue or digital filters with the selected cut-off corresponding to the roughness sampling length.

Profile Peak is the point of maximum height on a portion of a profile that lies above the mean line and between two intersections of the profile with the mean line.

Profile valley is the point of maximum depth on a portion of a profile that lies below the mean line and between two intersections of the profile with the mean line.

With number of peaks per cm is meant herein the number of Profile Peaks as defined in the above per cm.

For determining the relevant parameters, an Alicona Infinite Focus SL was used with the software IF-Measure Suite Version 5.1.

pictures were taken of each ply to be examined. On each picture, 10 lengths, each length being 1 cm, were drawn at different positions on the ply. Accordingly, 50 measurements (10 lengths on 5 pictures) were used for calculating the different parameters, and an average of all measurements was formed.

FIG. 3*a* is a graph illustrating roughness measurements on a ply being a creped ribbed ply, as measured along the cross-direction of the ply. The regular ribs and valleys are clearly visible from the graph, and the number of peaks per cm—corresponding to the number of ribs per cm—may be counted. In this sample, there are 8 peaks/cm.

FIG. 3*b* is a graph illustrating roughness measurements on a ply being an ordinary CWP ply, i.e. a creped ply not being defined as a creped ribbed ply. The measurement is made along the machine direction of the ply, and hence illustrates the appearance of the creping lines. It is seen how the creping lines lack the regular appearance of the ribs-and-valleys in FIG. 3*a*.

For a creped ribbed ply, the appearance of the ply if roughness is measured along the machine direction, i.e. parallel to the ribs and valleys, may be found to be similar to the one in FIG. 3*b*, namely to display conventional creping lines.

A non-ribbed ply is defined herein as a ply displaying no parallel ribs and valleys extending continuously along any direction of the ply or displaying parallel ribs and valleys extending continuously along any direction of the ply, said ribs and valleys providing a number of peaks being less than 4 per cm. For variants of non-ribbed plies displaying no parallel ribs and valleys extending continuously along any direction of the ply, it will be sufficient to determine that no such continuous structures exist. For the case where the non-ribbed ply displays ribs and valleys continuously along any direction of the ply, but with a number of peaks less than 4 per cm, peaks-per-cm measurements such as those laid out in the above may be performed.

Figure 4:
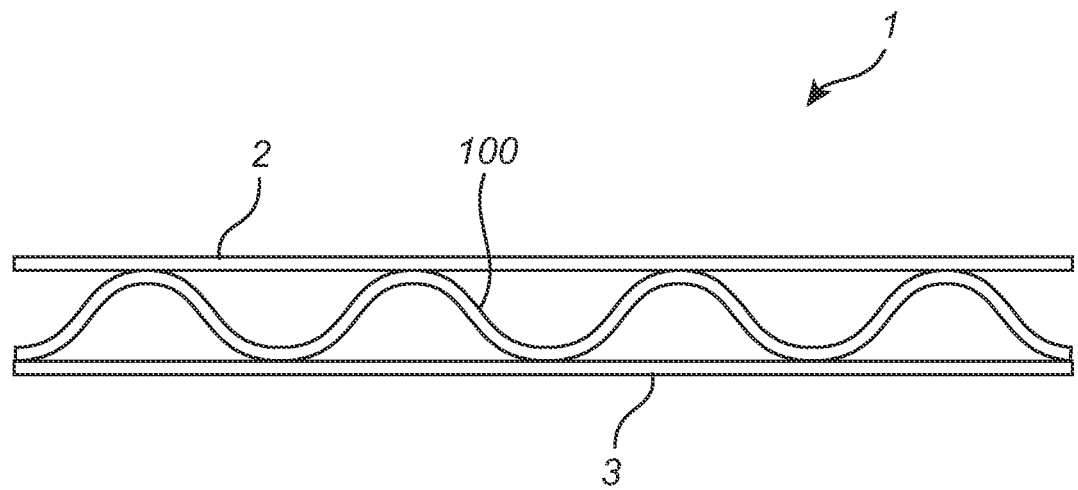
FIG. 4 schematically illustrates a multi-ply product.

FIG. 4 schematically illustrates a variant of a multi-ply tissue paper product 1. It includes three plies, namely a first outermost ply 2, a second outermost ply 3 and an inner ply 100.

The inner ply 100 is a creped ribbed ply as described above, as illustrated by the undulations in the drawing forming ribs and valleys.

With "outermost ply" is meant an outermost ply of the multi-ply tissue paper product 1. For example, the first outermost ply 2 may be a top ply of the tissue paper product 1, and the second outermost ply 3 may be a bottom ply of the tissue paper product 1.

The outermost plies 2, 3 are non-ribbed plies as described above.

A multi-ply tissue paper product 1 may be a three-ply product consisting of three plies being said first outermost ply 2, second outermost ply 3 and said inner ply 100. In such a product the inner ply 100 being a creped ribbed ply is sandwiched between the first and second outermost plies 2, 3.

However, and as will be demonstrated in the following examples, variants with more than three plies are readily conceivable.

Regardless of the number of plies, the plies of the tissue product may be combined together by a combining operation of a chemical nature (e.g. by adhesive bonding), or of a mechanical nature (e.g. by knurling or edge-embossing), or a combination of both as mentioned in the above.

The first and/or second outermost ply may be embossed.
The first and/or second outer ply 2, 3 may be creped plies.
The first and/or second outer ply 2, 3 may be TAD plies.

Figure 5:
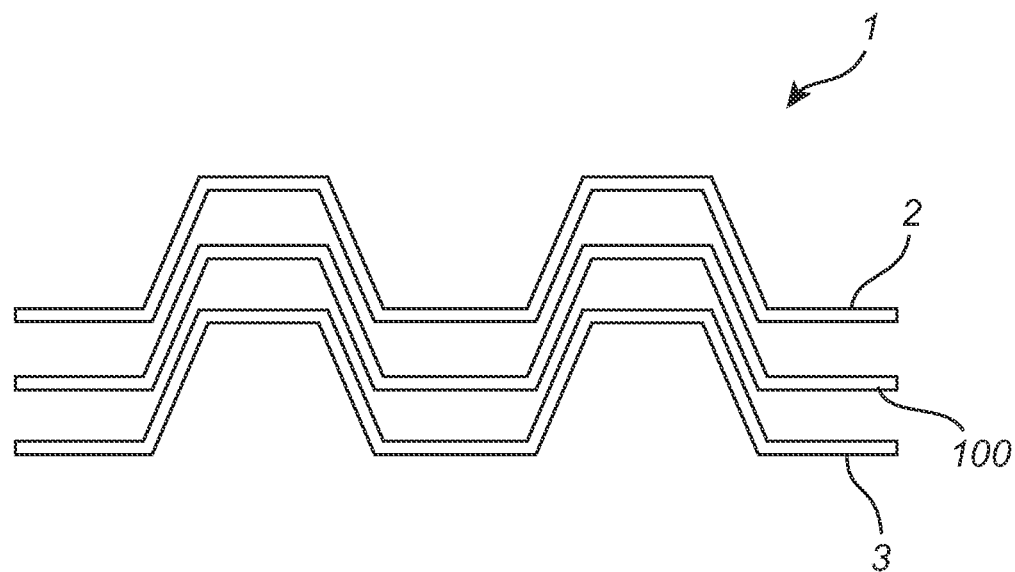
FIG. 5 schematically illustrates another multi-ply product.

FIG. 5 is a schematic side view of another variant of a multi-ply tissue paper product 1 comprising a first outermost ply 2, a second outermost ply 3 and an inner ply 100. The inner ply 100 is, although not illustrated in the drawing, a creped ribbed ply. The first and second outermost plies 2, 3 are non-ribbed plies.

In this tissue paper product 1, the first outer ply 2, the second outer ply 3 and the inner ply 100 are all construction embossed to achieve the bonding between the plies 2, 3, 100.

Figure 6:
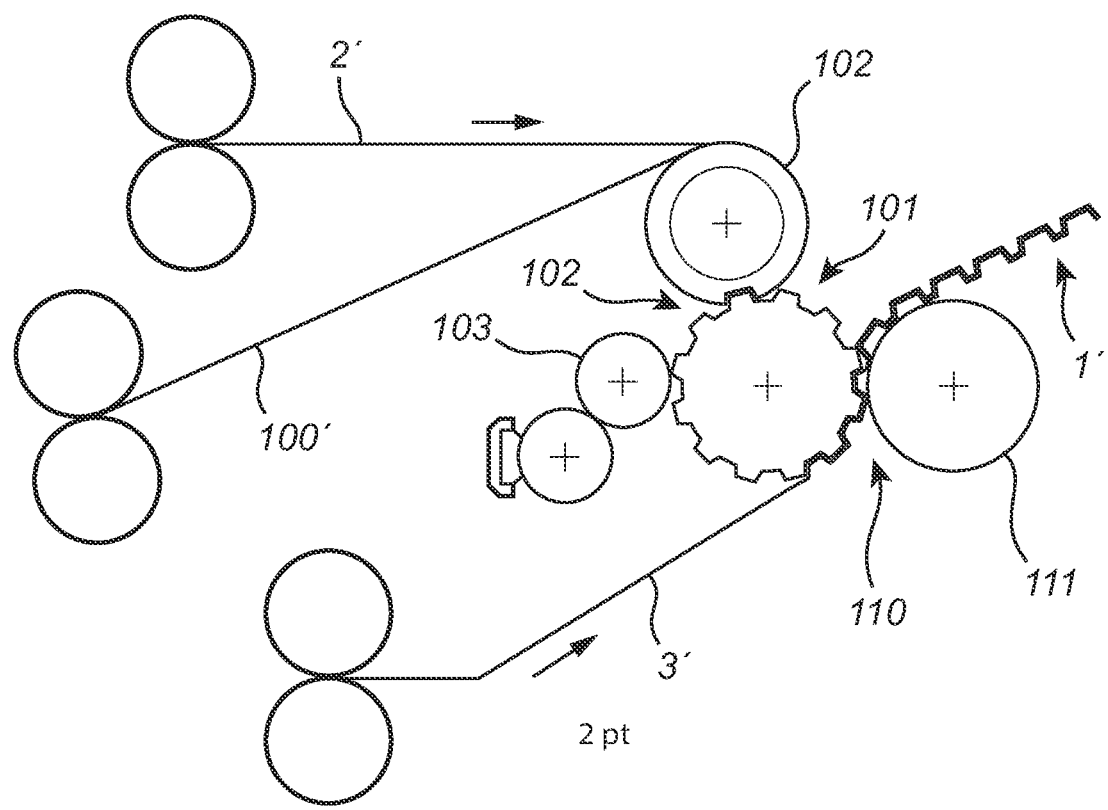
FIG. 6 schematically illustrates a manufacturing method suitable for achieving a multi-ply product.

The first and second outermost plies 2, 3 may be non-embossed, i.e. they may have no other embossments than said construction embossments. Alternatively, the first and second outer plies 2,3 may be pre-embossed FIG. 6 schematically illustrates a variant of a manufacturing method which may be used to provide a multi-ply tissue product.

A first web 2' and a second web 100' are directed together through a nip between an embossing roll 101 and an anvil roll 102. In this nip the first web 2' and the second web 100' are simultaneously provided with an embossing pattern.

Thereafter, an application roll 103 for adhesive applies adhesive to those parts of the second web 100' at which there are protruding embossing elements in the embossing roll 101. (The adhesive is transported from an adhesive batch via an adhesive transfer roll to the application roll.) A third web 3' is transported to the second web 100' and adhesively bonded to the second web 100' in a nip 110 between the embossing roll 101 and a marrying roll 111. The adhesive bonding takes place at those portions of the webs at which the adhesive was applied.

The resulting multi-ply web 1' comprises three correspondingly embossed plies, bonded together by embossing and adhesive bonds. As will be understood from the above description, if the multi-ply web 1' is formed to multi-ply tissue products e.g. by continued converting, in the tissue product 1 the first web 2' forms the first outermost ply 2, the second web 100' forms the inner ply 100 and the third web 3' forms the second outermost ply 3.

The manufacturing method principally described in FIG. 6 is not limited to manufacturing of webs or products comprising three plies only. Instead, more than three plies may be achieved, for example four plies or five plies.

In particular, a four-ply web or product may be achieved, in which the two inner plies are both creped ribbed plies as described in the above.

Figure 7:
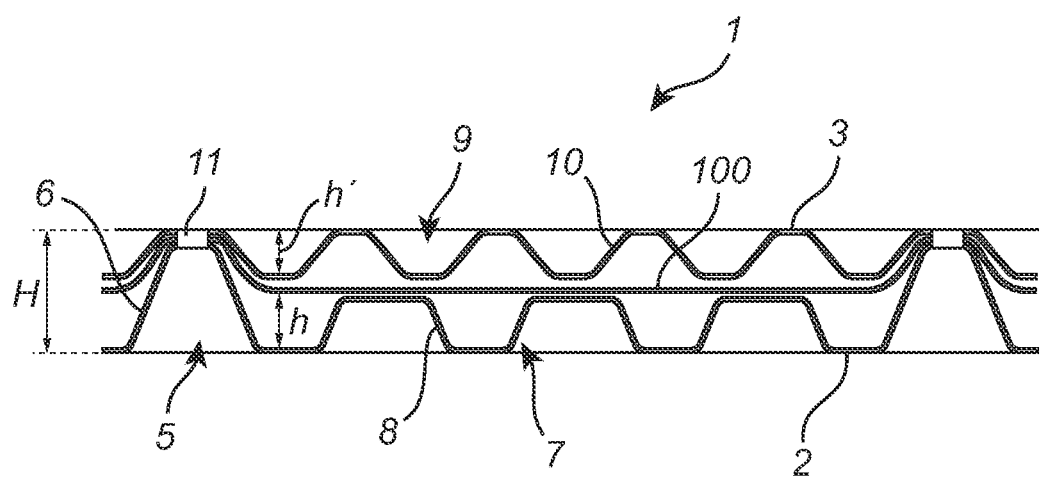
FIG. 7 schematically illustrates yet another multi-ply product.

FIG. 7 is a schematic side view of yet another multi-ply tissue product 1, which is assembled according to the method of the type referred to herein as "Nesfip" and as described in more detail in EP 1 081 284 A1. The product 1 comprises a first outermost ply 2, a second outermost ply 3, and an inner ply 100. The inner ply 100 is, although not illustrated in the drawings, a creped ribbed ply. The first and second outer plies 2, 3 are non-ribbed plies.

The first outermost ply 2 and the second outermost ply 3 are embossed with patterns 5, 7, 9 at least in part composed of discrete protrusions 6, 8, and 10. The protrusions face the inner ply 100.

The inner ply 100 is non-embossed. As such, the inner ply 100 may serve to hinder unintentional nesting between the adjacent layers, i.e. the first and second outer plies 2, 3.

The first outer ply 2 comprises a first embossment pattern 5 and a second embossment pattern 7. The height h of the second pattern 7 is less than the height H of the first pattern 5. The first pattern 5 comprises relatively high protrusions 6 with and the second pattern 7 comprises relatively low protrusions, the high protrusions 6 of the first pattern 5 being of heights H and the low protrusions 8 of the second pattern 7 having the height h less than those of the high protrusions, H>h.

Advantageously and as shown in FIG. 7, the second outer ply 3 comprises a single pattern 9, for example implemented by protrusions 10 of the height h'.

The plies 2, 3, and 100 are combined by joining the distal areas of at least part of the high protrusions 6 of the first outermost ply 2 and of at least part of the second outermost ply 3 with the inner ply 100.

At least one of the outer plies 2, 3 may comprise a pattern with a pattern density larger than 30 protrusions/cm$^2$.

Figure 8:
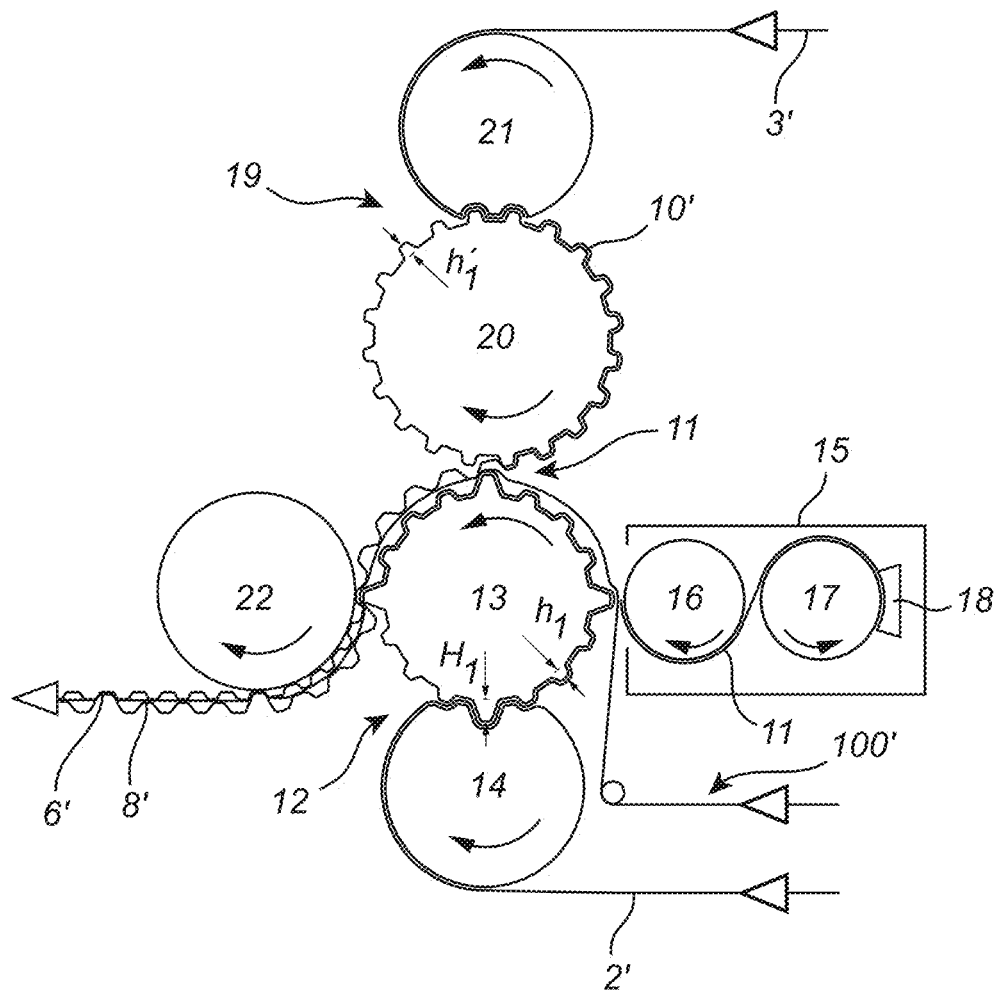
FIG. 8 schematically illustrates a manufacturing method for achieving a multi-ply product.

FIG. 8 illustrates schematically a variant of a method for producing a multi-ply tissue product being a Nesfip-type method.

In FIG. 8, a first web 2' to form the first outer ply 2 is embossed in a first embossing apparatus 12 including an engraved cylinder 13 and a mating rubber cylinder rotating in the opposite direction. The cylinder 13 is engraved in a first relatively high pattern having embossing tips of height H1 and a relatively shallower pattern of embossing tips of height h1.

Thanks to the double-level engraving by the cylinder 13, a first pattern 5 and a second pattern 7 is made on the first outermost ply 2. The first pattern 5 is composed at least partly of high discrete protrusions 6 of height H. This pattern 5 with a relatively high embossment height H1 may form decorative elements, for example picots and/or flowers. The second pattern 7 is composed of relatively low protrusions 8 of height h, for example micro dots. The heights H and h depend on the depths H1 and h1 of the engravings and also on the other embossing parameters, such as pressure, rubber quality, etc.

Preferably, the inner web 100', being a creped ribbed web as explained in the above, is previously non-embossed. The inner web 100' is moved into position and superposed on the protrusions 6', 8' of the first embossed outermost web 2' at the level of the engraved cylinder 13. In this manner, the web 100' hugs the high protrusions 6' of the embossed outer web 2' while remaining substantially planar between two consecutive high protrusions 6', the planar areas of the low protrusions 8' being able to act as intermediary supports.

At the level of this junction between the embossed outer web 2' and the inner web 100', an adhesive 11 is applied to the outer side of the inner web 100' using a glue dispenser 15.

In parallel, a second outer web 3' is embossed separately by means of a second embossing apparatus 19 into an embossment pattern 9 at least in part composed of discrete protrusions 10' of height h'. The apparatus 19 includes a cylinder 20 engraved with a pattern of embossing tips of height h4' a and a mating rubber cylinder.

Figure 9:
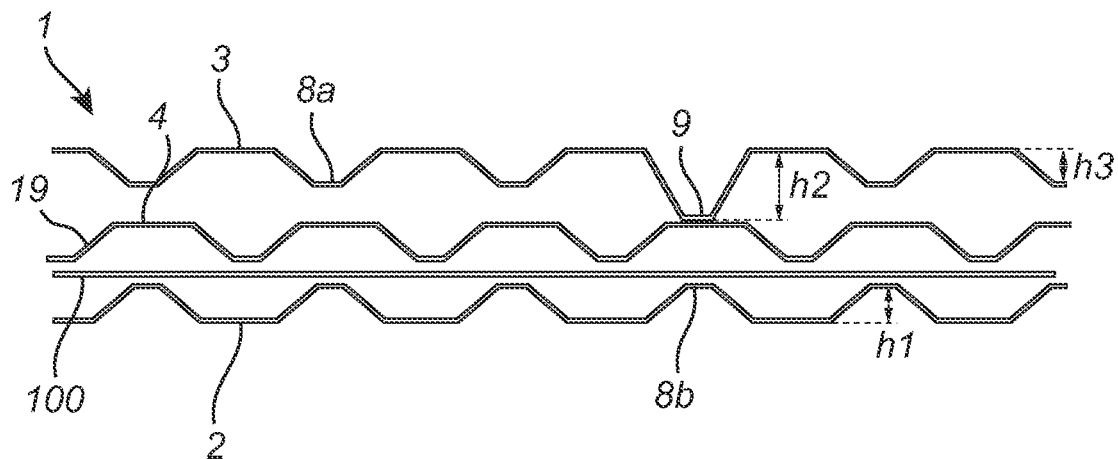
FIG. 9 schematically illustrates yet another multi-ply product having four plies.

FIG. 9 is a schematic side view of another multi-ply tissue product 1. The tissue product 1 has a first outermost ply 2 which is a bottom ply and a second outermost ply 3 which is a top ply. The tissue product of FIG. 9 may be produced in accordance with a method of the type denoted herein as "NoveFip" and described in PCT/IB2018/001556.

The first outermost ply 2 and the second outermost ply 3 are both provided with an embossing pattern including micro-embossed protrusions 8a, 8b.

However, it is also possible to provide first and/or the second outermost ply 2, 3, as so-called structured plies, for example manufactured by means of a Through Air Drying Process (TAD).

In the example according to FIG. 9, two inner plies 4 and 100 are provided. The first inner ply 100 is a creped ribbed ply. The first inner ply 100 is un-embossed (which means that first inner ply 100 is not embossed by means of a contact with an embossing roll before it is fed to the final ply-bonding).

In the illustrated embodiment the first inner ply 100 being a creped ribbed ply is adjacent to the bottom ply being the first outermost ply 2.

The second inner ply 4 between the first inner ply 100 and the second outermost ply 3 is a non-ribbed ply. The second inner ply 4 is micro-embossed in order to increase the bulk of the tissue product 1.

The first outermost ply 2 comprises a micro-embossed pattern comprising embossed protrusions 8b having a height h1. The second outermost ply 3 comprises a micro-embossed pattern comprising embossed protrusions 8a having a height h3. The height h3 of the micro-embossed pattern of the second outermost ply 3 may be different from the height h1 of the micro-embossed pattern of the first outermost ply 2.

In addition to the micro-embossed pattern comprising the embossed protrusions 8a, the second outermost ply 3 may comprise a décor embossed pattern comprising decor embossed protrusions 9. The décor embossed protrusions 9 may have a height h2 higher than the height of the micro-embossed protrusions 8a of the second outermost ply 3. At the décor embossed protrusions 9 with said height h2, ply-bonding between all of the plies is achieved.

The application of adhesive may be restricted to an overall surface fraction of less than 10% of a total area of said multi-ply tissue product 1, preferably less than 6% of a total area of said multi-ply tissue product 1, most preferred 3 to 6%.

The restricted amount of adhesive is beneficial for the perceived softness of the product.

The micro-embossed protrusions 19 of the second inner ply 4 and the micro-embossed protrusions 8a of the adjacent second outermost ply 3 are not in register with one another. This increases the bulk and absorbency of the tissue product 1 because the protrusions 19, 8a cannot nest one into the other which would reduce the thickness of the tissue product.

Also, the micro-embossed protrusions 19 of the second inner ply 4 and the micro-embossed protrusions 8a of the adjacent second outermost ply 3 may have different densities so as to avoid/limit unintentional nesting between the protrusions 19, 8a which would reduce the thickness of the tissue product.

As may be seen in FIG. 9, the protrusions 19 of the micro-embossed second inner ply 4 cannot nest with the protrusions of the first outermost ply 2 as in between there is the non-embossed first inner ply 100. The thickness is not reduced which is positive for the bulk and absorbency of the tissue product 1.

Figure 10:
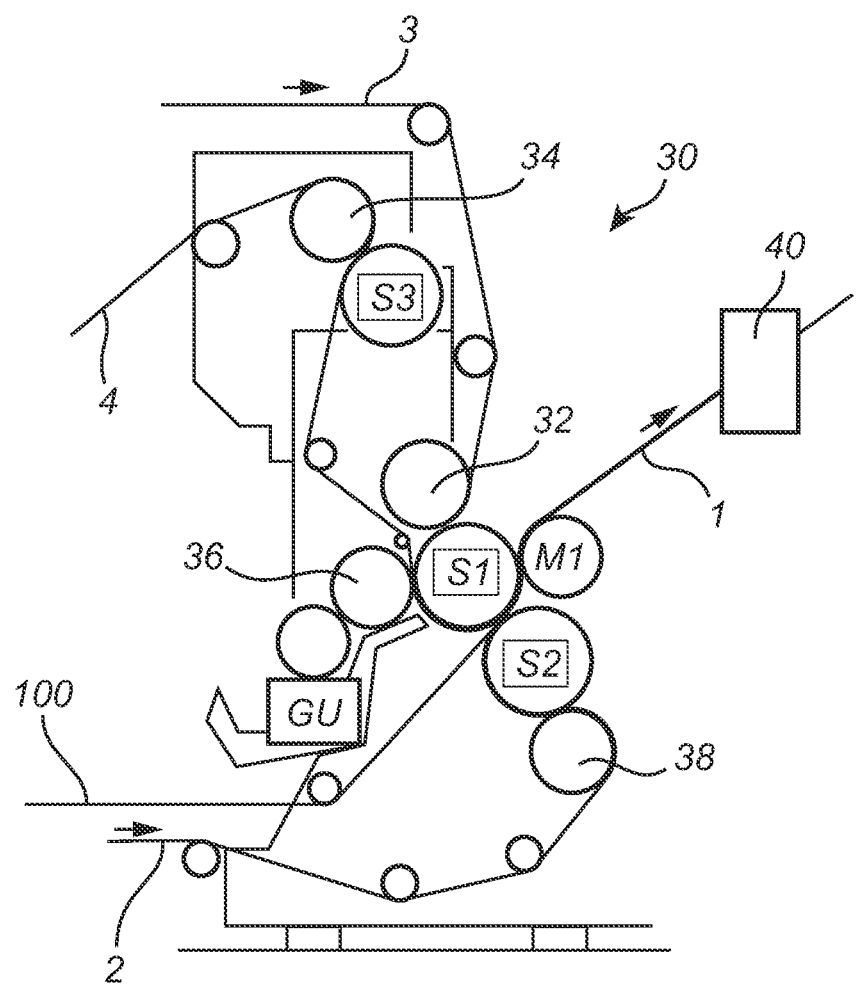
FIG. 10 schematically illustrates a manufacturing method suitable for achieving a multi-ply product.

FIG. 10 schematically shows a device for manufacturing a multi-ply tissue product according a method of the type referred to herein as Novefip. The first outermost web 2, the second outermost web 3, the first inner web 100 and the second inner web 4 are directed into the device 30.

The central element of the device 30 is the embossing roll S1 which is an engraved steel roll. The second outermost web 3 is directed into the nip between the embossing roll S1 and a counter roll 32 in order to emboss the second outermost web 3. After having been embossed, the second inner web 4 joins the second outermost web 3. Before joining the second outermost web 3 at the embossing roll S1, the second inner web 4 is micro-embossed in the nip between the engraved steel embossing roll S3 and the counter roll 34.

After the second outermost web 3 and the second inner web 4 have been joined at the embossing roll S1, glue is applied towards the second inner web 4 by means of a glue application device GU. Since the embossing roll S1 has micro-embossing protrusions of a smaller height and décor embossing protrusions of a greater height, the glue is only applied towards the second inner web 4 at the décor embossing protrusions with the greater height.

The first inner web 100 is non-embossed and fed towards the embossing roll S1 downstream of the glue application device GU. The first inner web 100 is directed into the gap between the embossing roll S1 and a second embossing roll S2 which also runs against the counter roll 38. The second embossing roll S2 is also an engraved steel roll with a micro-embossing pattern. In the nip between the second embossing roll S2 and the counter roll 38, the first outermost web 2 is embossed. The first inner web 100 joins the second inner web 4 and the first outermost web 2 and becomes sandwiched between these two.

After leaving the gap between the embossing roll S1 and the second embossing roll S2, the multi-ply structure is directed into the nip between the embossing roll S1 and a marrying roll M1 where the final ply bonding takes place. Downstream of the marrying roll M1, the multi-ply tissue web 1 can be directed to a perforating unit 40 at which the tissue web 1 receives perforation lines which are provided at regular intervals in a direction perpendicular to the longitudinal direction of the multi-ply tissue web 1.

Downstream of the perforating unit 40, the tissue web 1 can be wound to a roll or folded to a stack. Instead of perforations, the web 1 could be separated into individual pieces and optionally be folded to become a stack of individual sheets.

Detailed Examples

In the examples below, comparative examples are made between products including an inner ply being a creped ribbed ply as defined herein, and products without such a creped ribbed ply.

In the examples, the different plies are combined using different ply-bonding methods.

Non-ribbed plies used as outer plies:

| Product | Basis weight gsm | Thickness, mm (12 ply) | MD tensile strength, N/m | CD tensile strength, N/m | MD stretch, N/m |
|---|---|---|---|---|---|
| TAD | 19.3 | 2.9 | 95 | 53 | 11.8 |
| Omega | 20.1 | 1.67 | 135 | 60 | 22.7 |
| Trio | 18.8 | 1.75 | 91 | 51 | 24.1 |
| Reference | 17.7 | 1.25 | 206 | 147 | 21.5 |

Non-ribbed ply used as outer or inner ply:

| Product | Basis weight gsm | Thickness, mm (12 ply) | MD tensile strength, N/m | CD tensile strength, N/m | MD stretch, N/m | Softness (TSA) |
|---|---|---|---|---|---|---|
| Reference | 17.7 | 1.25 | 206 | 147 | 21.5 | 2.0 |

Creped ribbed ply:

| Product | Basis weight gsm | Thickness, mm (12 ply) | MD tensile strength, N/m | CD tensile strength, N/m | MD stretch, N/m | Softness (TSA) |
|---|---|---|---|---|---|---|
| Thunder E | 16.4 | 1.95 | 158 | 120 | 24.0 | 0.7 |

For the creped ribbed ply "Thunder E", the number of peaks in the cross direction coming from the ribs and valleys is 9/cm, and Rk in cross direction is 70.7 µm. These measurements were made on the Yankee side of the ply, and in general, the ribs and valleys are slightly more pronounced on the Yankee side than on the Hood side of a ply.

The number of crepe lines of the Thunder E ply were 61/cm as measured in MD on the Hood side.

The non-ribbed plies TAD, Omega, Trio and Reference, were all found to have Rk values of at least 0.35 µm. However, none of them displayed any parallel ribs and valleys extending continuously along the plies.

In the below, the methods used for determining the various parameters were the following:

Firmness:

Firmness is a compression value measured on roll radius with a compression mass of 1 kg. The roll is positioned on a core support, and with a measurement plate for applying 1 kg weight to the middle of the roll. The 1 kg weight is slowly put on the measurement plate. 5 s after applying the roll, the movement of the measurement plate is recorded.

The firmness unit is 1/10 mm. For each roll, an average of 2 measurements is reported.

The rolls are conditioned for 24±4 h at 50±10% r. h. and 23±1° C.

The values in the table below indicate the firmness of the rolls from which the samples were taken. Firmness of the roll could influence the thickness of the product. To exclude this effect, comparison have been made between rolls having a similar firmness. As a consequence, sheet count and roll diameter of compared rolls are different.

Further details regarding firmness may be found in EP 1 541 756 A1

Basis Weight:

Basis weight is determined in accordance with ISO 12625-6: 2016.

The basis weight is determined in g/m².

Thickness Per Sheet:

Thickness is determined in accordance with ISO 12625-3.

Dry Tensile Strength (MD, CD) and Tensile Stretch:

Dry tensile strength and tensile stretch are determined in accordance with ISO 12625-4.

A load cell of 100N was used.

Absorption:

Absorption is herein the water absorption capacity of the tissue paper. Water absorption capacity is the amount of water the sample is able to absorb, reported in g/g (i.e. g water/g material in sample).

Absorption was measured according to ISO12625-8: 2011,

The water is deionized water, conductivity 0.25 mS/m at 25° C., in accordance with ISO14487.

Tsa Softness:

TSA indicates herein measurements of softness made with a softness test method (TSA—Tissue Softness Anlalyzer), that uses acoustic waves and has demonstrated to correlate well with hand panel tests for thin materials like tissue. The test method follows the general outline of the TSA instrument manual dated 2013 Jul. 8 (Collection of the TSA Operating instruction, Multi Functional Measuring system, Tissue Softness Analyzer, 2012 Dec. 12, available from EMTEC electronic GMBH with the settings as set forth therein or in WO 2019/221647 A1 by Essity Hygiene and Health Aktiebolag.

The Tissue Softness Analyzer TSA simultaneously gathers the essential single relevant parameters which have an influence on the tissue softness, and provides a comfort prediction.

The comfort prediction may be used to determine the softer one out of two tissues being compared. A higher value indicates a higher softness.

For the purpose of this application, the result of TSA measurements of "Thunder E" being a creped ribbed ply, and "Reference", being a non-ribbed ply are comparable results, showing that the "Reference" ply is indeed a softer ply than "Thunder E".

Softness Panel:

Panel softness is determined by evaluation made by panel members. The panelists rank products in terms of softness. The Softness Panel values are therefore comparative values enabling a comparison between the samples tested, rather than an absolute parameter.

The softer the product/tissue base sheet is rated the higher the value will be.

Softness values of tissue products (finished goods) and tissue base sheets are not directly comparable as there are different scales/reference products.

Each sample is composed of one product, i.e. a multi-ply tissue paper product.

The dimensions of the samples are therefore the dimensions of the finished products.

Samples are placed in MD before the panelists.

Samples are conditioned for minimum 2 hours in a controlled area at 23° C. and 50% relative humidity.

The different samples are comfort rated by ten panelists, and an average comfort rating for each product is determined over the panelists.

Hence, softness panel values are comparative values within a test and indicate the perceived softness of a product.

For the purpose of this application, softness panel values given in one and the same table are comparable and indicate the perceived relative softness of the products tested. The higher the value of the rating, the more comfortable is the product.

Tests: Nesfip
Three-ply products were produced using the Nesfip-technology.

Nesfip 3-Ply Products
  Outer plies: Omega
  Inner ply: Thunder E compared to Reference

| Plies in order | No of sheets | Roll diameter (mm) | Firmness (mm) | Basis weight (g/m²) | Thickness (1 sheet) (mm) | Dry tensile strength MD (N/m) | Dry tensile strength CD (N/m) | Softness panel | Absorption CEN (g/g) |
|---|---|---|---|---|---|---|---|---|---|
| Omega Reference Omega | 132 | 120.0 | 56 | 55.8 | 0.62 | 400 | 230 | 1.6 | 8.8 |
| Omega Thunder E Omega | 121 | 118.3 | 57 | 55.3 | 0.68 | 357 | 202 | 1.6 | 9.4 |

Outer plies: Trio and TAD
Inner ply: Thunder E compared to Reference

| Plies in order | No of sheets | Roll diameter (mm) | Firmness (mm) | Basis weight (g/m²) | Thickness (1 sheet) (mm) | Dry tensile strength MD (N/m) | Dry tensile strength CD (N/m) | Softness panel | Absorption CEN (g/g) |
|---|---|---|---|---|---|---|---|---|---|
| Trio Reference TAD | 132 | 120.8 | 66 | 53.2 | 0.63 | 282 | 204 | 1.6 | 10.5 |
| Trio Thunder E TAD | 121 | 118.0 | 68 | 53.3 | 0.64 | 231 | 206 | 1.6 | 10.8 |

Outer plies: TAD
Inner ply: Thunder E compared to Reference

| Plies in order | No of sheets | Roll diameter (mm) | Firmness (mm) | Basis weight (g/m²) | Thickness (1 sheet) (mm) | Dry tensile strength MD (N/m) | Dry tensile strength CD (N/m) | Softness panel | Absorption CEN (g/g) |
|---|---|---|---|---|---|---|---|---|---|
| TAD Reference TAD | 125 | 120.0 | 66 | 53.7 | 0.65 | 296 | 192 | 1.7 | 11.8 |
| TAD Thunder E TAD | 121 | 120.0 | 70 | 51.7 | 0.68 | 242 | 180 | 1.8 | 12.1 |

The sample tests confirmed that thickness is increased in samples comprising the Thunder E ply being a creped ribbed ply compared to the samples having no creped ribbed ply. Moreover, absorption increased in all of the samples comprising the Thunder E ply compared to the reference ply.

Moreover, the basis weight decreased or was not significantly affected in the samples comprising the Thunder E ply compared to the samples comprising the Reference ply.

Accordingly, an increased thickness is achieved using the inner ply(-ies) being a creped ribbed ply, although the basis weight of the multi-ply product is lower. This means that an increased thickness results using less material than in the reference sample.

In addition, the softness of the samples including the Thunder E inner ply was the same or not significantly affected as compared to the samples including the Reference inner ply. This was surprising since it was expected that the ribbed structure of the ribbed ply would have a negative impact on softness.

Accordingly, the results displayed in the above demonstrates how surprisingly soft products may be achieved with the advantages of higher thickness and less or the same fibre consumption, by using a inner ply being a ribbed ply as proposed herein.

Further tests have been made investigating the influence of nip size when forming products using the Nesfip method. Nip sizes 30/30 mm, 32/31 mm and 34/32 mm were compared. As expected, with increased embossing nips for the outer plies the thickness of the total product increases, both for products including an inner ply being a ribbed ply and for products not including such a ply. However, for the same nip size, the product with an inner ply being a ribbed ply was always found to be thicker than the product without a ribbed ply.

Novefip 4-Ply Products
Four-ply products were produced using the Novefip method.

Outer plies: Trio
Two inner plies: Reference+Reference or Reference+Thunder E

| Plies in order | No of sheets | Roll diameter (mm) | Firmness (mm) | Basis weight (g/m²) | Thickness (1 sheet) (mm) | Dry tensile strength MD (N/m) | Dry tensile strength CD (N/m) | Softness panel | Absorption CEN (g/g) |
|---|---|---|---|---|---|---|---|---|---|
| Trio Reference Reference Trio | 113 | 120.0 | 59 | 69.8 | 0.72 | 519 | 337 | 1.6 | 9.0 |
| Trio Reference Thunder E Trio | 105 | 119.8 | 62 | 69.1 | 0.78 | 485 | 352 | 1.7 | 9.4 |

Again, the results of the measurements performed on the tested samples confirm that good softness may be combined with increased absorption and thickness, this time with a slightly reduced basis weight.

Further, four-ply products were tested with both inner plies being ribbed plies, wherein the ribbed plies were oriented with the Yankee side of the plies upwards or downwards, respectively. The orientation of the ribbed ply was not found to have any influence on the thickness, strength, softness or absorption.

Novefip 5-Ply Products

Five-ply products were produced using the Novefip method.
Sample 1: 5 reference plies
Sample 2: 4 reference plies and 1 inner ply being a Thunder E ply
Sample 3: 5 Thunder E plies

| Plies in order | No of sheets | Roll diameter (mm) | Firmness (mm) | Basis weight (g/m²) | Thickness (1 sheet) (mm) | Dry tensile strength MD (N/m) | Dry tensile strength CD (N/m) | Softness panel | Absorption CEN (g/g) |
|---|---|---|---|---|---|---|---|---|---|
| Reference Reference Reference Reference Reference | 105 | 120.0 | 52 | 86.9 | 0.78 | 888 | 681 | 1.3 | 8.3 |
| Reference Reference Reference Thunder E Reference | 100 | 120.8 | 59 | 86.1 | 0.81 | 858 | 626 | 1.4 | 8.6 |
| Thunder E Thunder E Thunder E Thunder E Thunder E | 95 | 120.0 | 59 | 78.0 | 0.88 | 769 | 581 | 0.9 | 8.9 |

Also for-five ply Novefip products there is an increase in thickness without significant impact on softness or absorption when a product including an inner ply being a ribbed ply is compared to a product with no ribbed ply.

A product with only creped ribbed plies, i.e. where also the outermost plies are creped ribbed plies as defined herein, displays significantly reduced softness as compared to the products with non-ribbed outermost plies.

In all, the above tests of sample products confirm that products comprising an inner ply being a creped ribbed ply as described herein may provide higher thickness even with slightly lower weight than previous products, while still achieving at least satisfactory values for strength.

For all comparisons, the roll firmness was kept the same or at least on a similar level.

It is to be understood that the present disclosure is not limited to the variants described above and illustrated in the drawings; rather, the skilled person will recognise that many changes and modifications may be made within the scope of the amended claims. In particular, methods as proposed herein may be varied and adapted to produce variants of the products proposed herein.

The invention claimed is:

1. A multi-ply tissue paper product, comprising at least three plies wherein the tissue paper product comprising a first inner ply being a creped ribbed ply and having a basis weight of 10 to 30 gsm, and a first outermost ply and a second outermost ply on each side of said inner ply, said first and second outermost plies being non-ribbed plies,
wherein a creped ribbed ply is defined as a ply comprising creping lines extending along a first direction, and parallel ribs and valleys extending continuously along a second direction being substantially perpendicular to said first direction, said ribs and valleys providing an average core roughness Rk in the range 10 to 300 μm, and a number of peaks being 4 to 12 per cm as measured along said first direction;
wherein a non-ribbed ply is defined as a ply displaying no parallel ribs and valleys extending continuously along any direction of the ply or displaying parallel ribs and valleys extending continuously along any direction of the ply, said ribs and valleys providing a number of peaks being less than 4 per cm; and wherein said first inner ply and at least one of said first outermost ply and said second outermost ply comprise construction embossments configured to join at least two of the plies of said multi-ply tissue product, said construction embossments being applied over a total construction embossment area being less than 10% of a total area of said multi-ply tissue product.

2. Multi-ply tissue paper product according to claim 1, wherein said ribs and valleys of said first inner ply provides a number of peaks as measured along said first direction being 6 to 12 per cm, or said ribs and valleys of said first inner ply providing an average core roughness Rk in the range 20 to 150 μm.

3. Multi-ply tissue paper product according to claim 1, wherein said first inner ply has a basis weight of 12 to 28 gsm.

4. Multi-ply tissue paper product according to claim 1, wherein, on at least one side of said first inner ply, the tissue paper product comprises no more than two plies being non-ribbed plies external of said first inner ply.

5. Multi-ply tissue paper product according to claim 1, wherein on at least one side of said first inner ply, the tissue paper product comprises no more than one outer ply being a non-ribbed ply external of said inner ply.

6. Multi-ply tissue paper product according to claim 1, wherein said outermost ply or plies being a non-ribbed ply (ies) external of said inner ply has/each have a basis weight being less than 30 gsm.

7. Multi-ply tissue paper product according to claim 1, wherein said outermost ply or plies being a non-ribbed ply (ies) displays no parallel ribs and valleys extending continuously along any direction of the ply or each display parallel ribs and valleys extending continuously along any direction of the ply, said ribs and valleys providing a number of peaks being less than 2 per cm.

8. Multi-ply tissue paper product according to claim 1, wherein said outermost ply or plies being a non-ribbed ply (ies) displays no parallel ribs and valleys extending continuously along any direction of the ply or each display parallel ribs and valleys extending continuously along any direction of the ply, said ribs and valleys providing said ribs and valleys providing an average core roughness Rk less than 10 μm.

9. Multi-ply tissue paper product according to claim 1, wherein said multi-ply tissue paper product comprises an adhesive joining at least two of the plies of said multi-ply tissue product, said adhesive being applied over a total adhesive area being less than 10% of a total area of said multi-ply tissue product.

10. Multi-ply tissue paper product according to claim 1, wherein said multi-ply tissue paper product comprises no more than five plies.

11. Multi-ply tissue paper product according to claim 1 wherein said multi-ply tissue paper product comprises four plies only.

12. Multi-ply tissue paper product according to claim 1, wherein said multi-ply tissue paper product comprises three plies only.

13. Multi-ply tissue paper product according to claim 1, wherein said first or second outermost ply is a creped ply.

14. Multi-ply tissue paper product according to claim 1, wherein said first or second outermost ply is a structured ply.

15. Multi-ply tissue paper product according to claim 1, wherein the first or second outermost ply is a pre-embossed ply.

16. Multi-ply tissue paper product according to claim 1, wherein the product comprises at least a second inner ply.

17. Multi-ply tissue paper product according to claim 16, wherein the second inner ply is a pre-embossed ply.

18. Multi-ply tissue paper product according to claim 16, wherein said second inner ply is a creped ribbed ply.

19. Multi-ply tissue paper product according to claim 16, wherein the second inner ply is a non-ribbed ply.

20. Multi-ply tissue paper product according to claim 16, wherein said first inner ply is non-embossed, and said second inner ply is micro-embossed.

21. Multi-ply tissue paper product according to claim 16 wherein said first and second inner plies are adjacent plies in the product.

22. Multi-ply tissue paper product according to claim 16, wherein said first inner ply is non-embossed.

23. Multi-ply tissue paper product according to claim 16, wherein at least one of two adjacent plies to the first inner ply is/are construction embossed to join to the first inner ply.

24. Multi-ply tissue paper product according to claim 23, wherein said adjacent ply or plies are joined to the first inner ply by adhesive or mechanical ply-bonding.

25. Multi-ply tissue paper product according to claim 21, wherein at least one of said first and second inner plies are pre-embossed.

* * * * *